(12) United States Patent
Kim et al.

(10) Patent No.: US 8,160,360 B2
(45) Date of Patent: Apr. 17, 2012

(54) IMAGE PROCESSING APPARATUS AND METHOD AND A NON-TRANSITORY COMPUTER READABLE MEDIUM WITH COMPUTER EXECUTABLE INSTRUCTIONS STORED THEREON FOR PERFORMING AN IMAGE PROCESSING METHOD

(75) Inventors: Min-Seok Kim, Seoul (KR); Young-Hyun Kim, Seoul (KR)

(73) Assignee: Core Logic, Inc., Seoul (KR)

( * ) Notice: Subject to any disclaimer, the term of this patent is extended or adjusted under 35 U.S.C. 154(b) by 806 days.

(21) Appl. No.: 12/209,459

(22) Filed: Sep. 12, 2008

(65) Prior Publication Data

US 2009/0067721 A1     Mar. 12, 2009

(30) Foreign Application Priority Data

Sep. 12, 2007  (KR) .................. 10-2007-0092540

(51) Int. Cl.
  *G06K 9/34* (2006.01)
  *G06K 9/00* (2006.01)
(52) U.S. Cl. .................................................. 382/180
(58) Field of Classification Search .................. 382/164,
  382/173, 180, 195, 199, 203, 254, 276, 291,
  382/293, 296, 303, 308; 345/121, 418, 581,
  345/586, 719; 348/169; 386/169
  See application file for complete search history.

(56) References Cited

U.S. PATENT DOCUMENTS

| | | | | |
|---|---|---|---|---|
| 4,167,728 A | * | 9/1979 | Sternberg | 382/303 |
| 5,237,626 A | * | 8/1993 | Forslund et al. | 382/256 |
| 5,767,978 A | * | 6/1998 | Revankar et al. | 358/296 |
| 5,818,962 A | * | 10/1998 | Mizukami | 382/180 |
| 5,848,198 A | * | 12/1998 | Penn | 382/276 |
| 6,289,110 B1 | | 9/2001 | Kim et al. | |
| 6,546,185 B1 | | 4/2003 | Kim et al. | |
| 6,629,097 B1 | * | 9/2003 | Keith | 1/1 |
| 7,675,524 B1 | * | 3/2010 | Miller et al. | 345/586 |
| 2009/0067721 A1 | * | 3/2009 | Kim et al. | 382/180 |

FOREIGN PATENT DOCUMENTS

| | | |
|---|---|---|
| JP | 62287385 A | 12/1987 |
| JP | 7175925 A | 7/1995 |
| JP | 8185521 A | 7/1996 |
| JP | 2000078564 A | 3/2000 |

OTHER PUBLICATIONS

Lin, Hwei-Jen et al., "Face Detection Based on Skin Color Segmentation and Neural Network," IEEE, pp. 1144-1149 (2005).
Suzuki et al., "Linear-time connected-component labeling based on sequential local operations," Computer Vision and Image Understanding, 89 (2003).
Pitas, I., "Digital Image Processing Algorithms and Applications," pp. 300-303, 2003.
Cui Yanhua et al. "A Method for Automatic Segmentation of Visual Moving Objects", School of Telecommunication Engineering, ISN National Key Lab., Xidian Univer. Xi'am 710071, 2001.

* cited by examiner

*Primary Examiner* — Amir Alavi
(74) *Attorney, Agent, or Firm* — Edwards Wildman Palmer LLP (57) ABSTRACT

Image processing apparatus and methods perform effective labeling of objects in an image while advantageously requiring only a small memory. The apparatus and methods practicably and effectively implement various applications, in particular, a detection technique for determination of a detection target. The apparatus comprises a detection unit for detecting values of pixels adjacent to a target pixel within a transformation matrix area of a binary image. The apparatus also includes a labeling unit for assigning a label value to the target pixel. The assigned label value is either a new value or the value existing in the pixels adjacent the target pixel, depending on the value of the adjacent pixels' label.

21 Claims, 5 Drawing Sheets

| 0 | 0 | 0 | 0 | ... | 0 | 0 | 0 |
|---|---|---|---|---|---|---|---|
| 0 | 0 | 15 | 15 | ... | 0 | 0 | 0 |
| ... | ... | ... | ... |  | ... | ... | ... |
| 0 | 0 | 15 | 15 | ... | 15 | 15 | 0 |
| 0 | 0 | 0 | 0 | ... | 15 | 15 | 0 |

FIG. 6

| $b_{i-1,j-1}$ | $b_{i,j-1}$ | $b_{i+1,j-1}$ |
|---|---|---|
| $b_{i-1,j}$ | $a_{i,j}$ | $b_{i+1,j}$ |
| $b_{i-1,j+1}$ | $b_{i,j+1}$ | $b_{i+1,j+1}$ |

FIG. 7

(a) BEFORE MERGING  (b) AFTER MERGING

FIG. 8

(a) BEFORE FILTERING  (b) AFTER FILTERING

IMAGE PROCESSING APPARATUS AND METHOD AND A NON-TRANSITORY COMPUTER READABLE MEDIUM WITH COMPUTER EXECUTABLE INSTRUCTIONS STORED THEREON FOR PERFORMING AN IMAGE PROCESSING METHOD

CLAIM OF PRIORITY

This application claims priority under 35 U.S.C. §119(a) to Korean Patent Application No. 10-2007-0092540, filed on Sep. 12, 2007, in the Korean Intellectual Property Office, the entire contents of which are hereby incorporated by reference.

FIELD OF THE INVENTION

The invention relates to an image processing apparatus and method, which labels each object in an image to distinguish each object and uses the labeling to detect an object in the image.

BACKGROUND OF THE INVENTION

Labeling is one of the techniques in image signal processing for distinguishing different objects in an image. Labeling assigns a unique number to each object in an image that contains a plurality of objects. A specific object of interest is then processed using the object's unique number. The labeling technique has various applications in image processing. For example, in a facial recognition system for access control, the labeling technique detects and isolates a facial area in an image obtained by an optical device. The labeling technique and a technique for detecting a specific object in an image using labeling may also be used in iris recognition, recognition of a specific part of the human body, or a defect detection in automated manufacturing.

Conventionally, labeling uses either an iterative algorithm, an algorithm using one or more loops, recursive calls or a stack structure. A labeling algorithm stores information regarding a frame or a line of a desired image into a memory and then uses the stored information. If sufficient hardware resources are available, a conventional labeling algorithm may be used even though it requires a considerable amount of time. However, a conventional labeling algorithm is often impractical mobile equipment designed for portability, convenience, and mobility which typically has limited hardware resources and/or processing capacity, such as, for example, a mobile terminal. Also, facial recognition based on a labeling algorithm, as well as applications in a digital camera using facial recognition, such as, for example, AF (Auto Focus), AWB (Auto White Balance) or AE (Auto Exposure), are difficult to implement with limited hardware resources.

Recently, an interactive video call service has been introduced for entertainment purposes. A mobile terminal with a facial detection function has been developed for such a service, which expands the HCI (Human Communication Interact) technology to mobile terminals. However, such a terminal (a mobile phone, a digital camera, an optical device or a certification system) processes an input image using frame or line information stored in memory, thus requiring large memory resources. Consequently, as the hardware requirements increase, the hardware terminal becomes more expensive. Moreover, as mentioned above, conventional processing is based on memory storage and use of the stored information. Thus, processing time, including data storage and retrieval, also increases.

SUMMARY OF THE INVENTION

An object of the invention is to provide image processing apparatus and methods that detect an object in an image using a labeling technique having simple operations and requiring only a small memory.

Another object of the invention is to provide a computer readable medium having computer executable instructions stored thereon for performing methods of image processing using a labeling technique having simple operations and requiring only a small memory.

An image processing apparatus according to the invention comprises a detection unit for detecting values of pixels adjacent to a target pixel in a binary image using a transformation matrix area. The apparatus also includes a labeling unit for either assigning a new label value to the target pixel if the adjacent pixels contain only the two values representing the binary image, i.e., no label value exists in the adjacent pixels, or assigning the label value existing in the adjacent pixels to the target pixel if a label value already exists in the adjacent pixels.

An image processing method of the invention includes detecting values of pixels adjacent to a target pixel in a binary image using a transformation matrix area, and either assigning a new label value to the target pixel if the adjacent pixels contain only the two values representing the binary image, i.e., no label value exists in the adjacent pixels, or assigning the label value existing in the adjacent pixels to the target pixel if a label value already exists in the adjacent pixels.

BRIEF DESCRIPTION OF THE DRAWINGS

The features and advantages of the invention will become more apparent upon consideration of the detailed description taken in conjunction with the accompanying drawings, in which like reference characters refer to like parts throughout, and in which.

DETAILED DESCRIPTION OF THE INVENTION

While this specification contains many specifics these should not be construed as limitations on the scope of any invention described herein or of what may be claimed, but rather, as descriptions of features that may be specific to particular embodiments of particular inventions. Certain features that are described herein in the context of separate embodiments may also be implemented in combination in a single embodiment. Conversely, various features that are described in the context of a single embodiment may also be implemented in multiple embodiments separately or in any suitable subcombination.

It should be understood that the terms used herein and the appended claims are not necessarily limited to general and dictionary meanings, but should be interpreted based on the meanings and concepts corresponding to technical aspects of the invention as described herein.

Moreover, although features may be described in certain combinations and even initially claimed as such, one or more features from a claimed combination can, in some cases, be excised from the combination, and the claimed combination may be directed to a subcombination or variation of a subcombination.

Note that, generally, a color space of an image may be expressed in various formats, for example, RGB (Red, Green, Blue), CMYK (Cyan, Magenta, Yellow, Key (Black)), HS-family, CIE (The Commission Internationale d'Eclairage) or Y-family. A color space format may be converted into another format by a simple mathematical conversion formula.

An input image includes a plurality of pixels, and each pixel has its own image information (brightness, color, saturation, and so on). Generally, the image information has values of 0 to 255 and is expressed as an 8 bit unit of data. However, in alternative embodiments, image information may be expressed as a 10 bit or 12 bit unit of data depending on the particular application.

Therefore, it should be understood that a color space coordinate system used as an example herein may be applicable to another color space coordinate system, and a bit size of image information is merely exemplary for the purpose of illustration.

Figure 1:
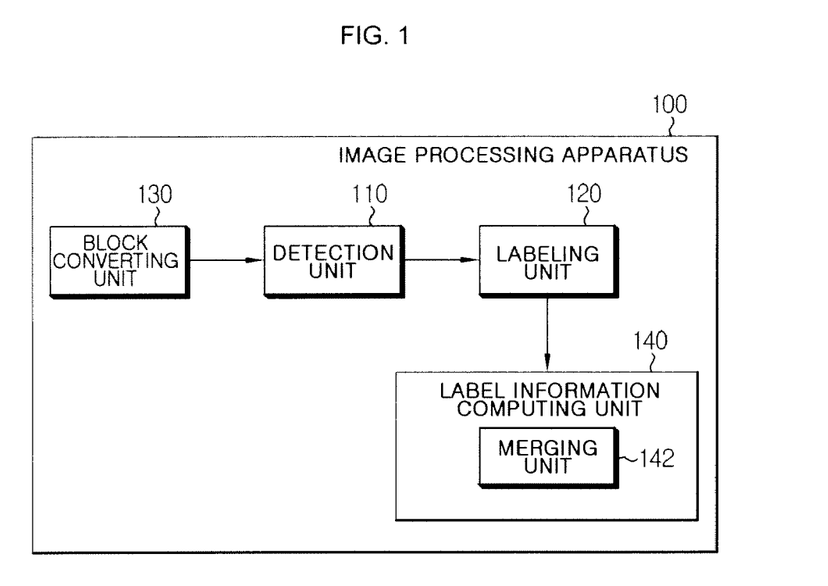
FIG. 1 illustrates an image processing apparatus according to an embodiment of the invention.
Figure 3:
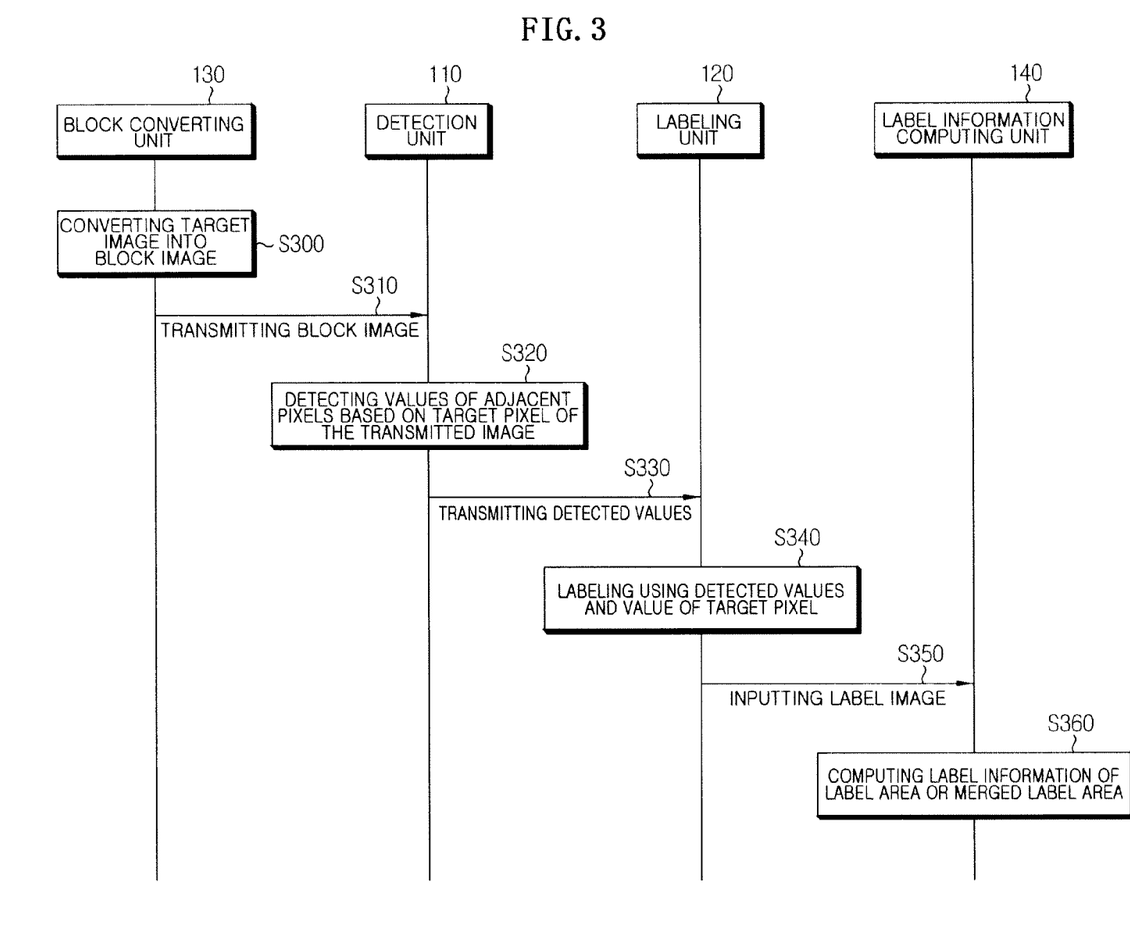
FIG. 3 illustrates an image processing method using the embodiment of FIG. 1.

Referring to FIGS. 1 and 3, the image processing apparatus 100 according to the invention comprises a block converting unit 130, a detection unit 110, a labeling unit 120, and a label information computing unit 140. The detection unit 110 detects values of adjacent pixels within a transformation matrix area around a target pixel in a binary image. The values include a first value corresponding to a pixel value smaller than a critical value and a second value corresponding to a pixel value larger than a critical value (S320).

The binary image is obtained by categorizing each pixel value into one of two categories based on a predetermined critical value used as a binarization standard. For example, if the critical value is 50, a pixel having a value smaller than 50 is interpreted as '0' and a pixel having a value larger than 50 is interpreted as '1'. Typically, the pixel values of the binary image are a two bit value, i.e., either '0' or '15'. However, the invention is not limited in this regard. For example, a binary image may have various symbols expressed in two levels based on a predetermined critical value as a binarization standard. In addition, a first value may be set to '0' and a second value may be set to '1' or '15'. However, the first and second values used herein are chosen only for illustrative purposes.

Figure 6:
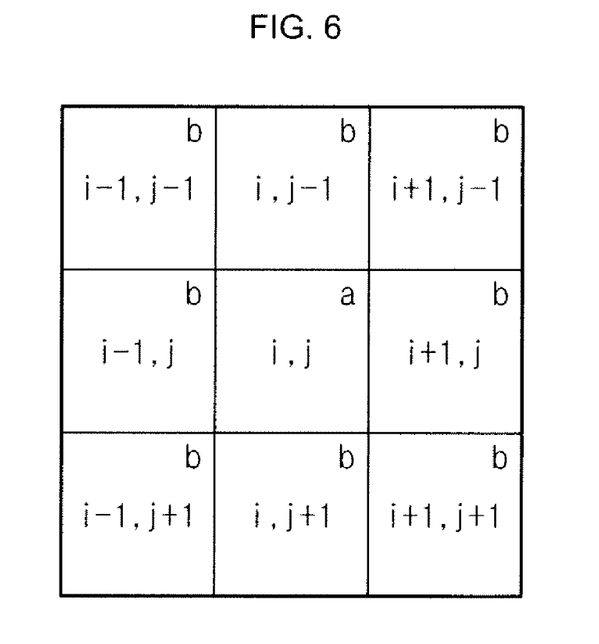
FIG. 6 illustrates a labeling filter of a transformation matrix according to an embodiment of the invention.

A transformation matrix is a predetermined square matrix. FIG. 6 shows a 3×3 matrix, however the size of a transformation matrix may vary according to the type of utility or desired labeling degree. The 3×3 matrix is preferable with respect to precision because pixels as little as one unit away from each other can be distinguished with a 3×3 matrix. FIG. 6 shows 9 pixels in the transformation matrix. Pixels (b) are adjacent pixels and pixel (a) is a target pixel. The values of the pixels (b) are detected by the detection unit 110.

The detection unit 110 detects the values of the adjacent pixels (b) and transmits the detected values to the labeling unit 120 (S330). If the value of the target pixel is a second value and the detected values of all adjacent pixels are only first and/or second values, then the labeling unit 120 converts the value of the target pixel to a new, unused label value. If the value of the target pixel is a second value and the detected values of the adjacent pixels include a label value other than a first or second value, i.e., a third value, the labeling unit 120 converts the value of the target pixel to that third value (S340).

S340 is performed in one of two ways: (1) if there is a value other than a value representing a binary image, i.e., a first or second value, in the adjacent pixels, the value of the target pixel is converted to that other label value, or (2) if there is no value other than a value representing a binary image among the values of the adjacent pixels, the target pixel value is converted to a new, unused label value. Thus, label value assignment is simple and effective.

In other words, if the target pixel value is a second value (because the value of the target pixel is larger than a predetermined critical value), the target pixel is considered a specific object existing in the image. Accordingly, the labeling process is performed where the value of the target pixel is a second value.

When the value of the target pixel is converted into a new, unused label value (when the values of the adjacent pixels include only a first and/or second value, i.e., when there is no value other than '0' and '1' in the adjacent pixels), the new label value should be different from any previously assigned label value of another target pixel, because it represents another object in the binary image.

If there is a value other than '0' and '1' in the adjacent pixels, i.e., if an adjacent pixel has been assigned a third label value, the adjacent pixel having the label value assigned in the previous operation is part of an object. Thus, the target pixel and the adjacent pixels are parts of the same object, and the target pixel is assigned the same third label value.

This process reads and operates on image information in a sequential order. The process eliminates the use of frame storage, line storage, a recursive algorithm and an algorithm using one or more loops, thus maintaining precision and performing labeling more easily and simply.

The block converting unit 130 divides a target image into a predetermined number of blocks according to a block ratio. If the number of pixels corresponding to a critical range in each block is more than a reference number, the block converting unit 130 assigns a second value to the block. If the number of pixels corresponding to a critical range is less than a reference number, the block converting unit 130 assigns a first value to the block. The values assigned to a block become the values of each pixel in the block. Thus, the block converting unit 130 converts the target image into a block image (S300). After the image is converted into a block image, the detection unit 110 receives the block image as a binary image (S310).

The block conversion, detection and labeling of a block image are now described through specific examples.

For convenience of description and understanding, assume that a target image for labeling conversion has a 100×100 size. If the 100×100 image is divided into 10×10 blocks the block ratio is 10% and the number of blocks is 100. The block ratio and the number of blocks are chosen depending on the available hardware resources and other conditions. Some of those conditions are the various factors that users can set, such as, for example, operating time accuracy, labeling or detecting efficiency, etc.

Figure 5:
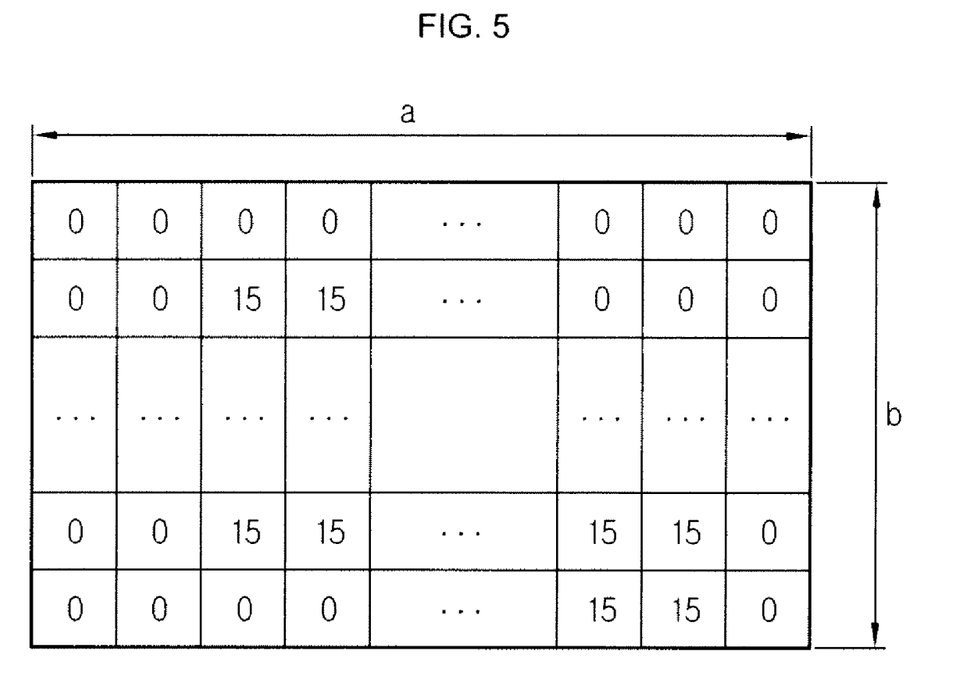
FIG. 5 illustrates a block image according to an embodiment of the invention.

As shown in FIG. 5, the row size, 'a', of a block image is set to 10 and column size 'b' is set to 10. For a binary image, the first value is set to '0' and the second value is somewhat arbitrarily set to '15'. In this example, one block represents 100 pixels of an original image, and 100 blocks represent 10,000 pixels of an original image.

Preferably, image information from each pixel is used as a conversion variable in the block conversion process. That is, a pixel has image information about color, brightness and so on. It is preferable to detect a human face based on Cb and Cr information. The number of pixels corresponding to a critical range, where Cb and Cr values are set to the range representing a human face, is counted. The critical range based on Cb and Cr can be applied generally to all human races. After a predetermined critical range of Cb and Cr values is set, the number of pixels corresponding to the critical range in one block is counted. That number of pixels is compared with a reference number. If the number is larger than the reference number, the second value (15) is assigned. If the number is smaller than the reference number, the first value (0) is assigned. The reference number may vary according to applications such as image condition or the characteristics of an object. A target image is converted into a block image of 10×10 size by the above-mentioned process, where the block image has a block with pixels assigned either the second value (15) or the first value (0) as a pixel.

The block image converted by the above-mentioned process is shown in Table 1.

TABLE 1

| 0 | 0  | 0  | 0  | 0  | 0  | 0 | 0  | 0 | 0 |
|---|----|----|----|----|----|---|----|---|---|
| 0 | 15 | 15 | 15 | 15 | 0  | 0 | 15 | 0 | 0 |
| 0 | 15 | 15 | 15 | 0  | 0  | 0 | 15 | 0 | 0 |
| 0 | 15 | 15 | 15 | 0  | 0  | 0 | 15 | 0 | 0 |
| 0 | 0  | 0  | 0  | 0  | 0  | 0 | 0  | 0 | 0 |
| 0 | 0  | 0  | 0  | 0  | 0  | 0 | 0  | 0 | 0 |
| 0 | 0  | 0  | 0  | 15 | 15 | 0 | 0  | 0 | 0 |
| 0 | 15 | 0  | 0  | 0  | 0  | 0 | 15 | 0 | 0 |
| 0 | 15 | 0  | 0  | 0  | 0  | 0 | 15 | 0 | 0 |
| 0 | 0  | 0  | 0  | 0  | 0  | 0 | 0  | 0 | 0 |

Table 1 shows the second value as '15' and the first value as '0'. As mentioned above, the numeric values of the first and second values of a binary image may vary according to a particular embodiments.

Preferably, a block ratio is set with a block image of size 32×24 for visual recognition of a target image and distinction by labeling. A block image set to this size can distinguish about 10 objects when judged in view of typical properties of an image. Block images of smaller size increases the possibility that an object a user wants to detect is not included in the image, and block images of larger size decreases efficiency. To be able to label each of the different objects in the block image, a corresponding number of labeling values should be available for assignment.

The labeling unit 120 is therefore preferably configured to assign a label value using a string of 4 bits. According to the binary system, 15 values are possible if 4 bits are used, which is a preferred label value size assigned for distinguishing objects.

Preferably a block ratio of a target image is set to a value in the range 3% to 10% to maintain the performance of labeling and object detection based on labeling and to ensure efficiency of a processing module and memory.

As a binarization value, the first value is set to '0' and the second value is set to '15' in FIG. 5. This allows a simple algorithm to be used for assigning new label values, a number between 0 to 15, by starting with the number 1 and incrementing by 1 to obtain additional new label values. This algorithm eliminates the need to check whether a label value was previously assigned.

In the case where a target pixel is located at (2,2) of Table 1, the target pixel has a second value of '15'. A value other than the first value and the second value does not exist in the adjacent pixels within the 3×3 transformation matrix area.

Thus the target pixel is assigned a new label value. Assuming that the pixel (2,2) is the starting location of a labeling operation, a new label value of '1' is assigned to that pixel.

TABLE 2

| 0 | 0  | 0  | 0  | 0  | 0 | 0 | 0  | 0 | 0 |
|---|----|----|----|----|---|---|----|---|---|
| 0 | 1  | 15 | 15 | 15 | 0 | 0 | 15 | 0 | 0 |
| 0 | 15 | 15 | 15 | 0  | 0 | 0 | 15 | 0 | 0 |

Referring to Table 2, the transformation matrix is moved along the row to the right as shown. A pixel located at (2,3) becomes the next target pixel. This pixel has a value of '15'. The adjacent pixels of the target at (2,3) are 8 pixels assigned with values of 0,0,0,1,15,15,15 and 15 listed row-wise from the upper left corner to the lower right corner of the transformation matrix. Note that the value of the pixel (2,2) is '1', the label value assigned in the previous location of the transformation matrix. Thus, there is a label value other than the first value (0) and the second value (15) in the 8 adjacent pixels within the transformation matrix area. The target pixel (2,3) is therefore converted to the label value '1'. That is, the labeling operation is performed such that a label value assigned to a pixel adjacent the target pixel is expanded to the target pixel.

Labeling operations are then performed on the remaining pixels in the second row by moving the transformation matrix along the row. The results are shown in Table 3.

TABLE 3

| 0 | 0  | 0  | 0  | 0 | 0 | 0 | 0  | 0 | 0 |
|---|----|----|----|---|---|---|----|---|---|
| 0 | 1  | 1  | 1  | 1 | 0 | 0 | 2  | 0 | 0 |
| 0 | 15 | 15 | 15 | 0 | 0 | 0 | 15 | 0 | 0 |

As shown in Tables 2 and 3, pixels located at (2,6) and (2,7) are assigned a first value '0', and thus the (2,6) and (2,7) pixels are not targets for labeling conversion. A pixel located at (2,8) is assigned a second value '15', and thus a label value of the (2,8) pixel is a target for labeling conversion. A label value other than '0' and '15' does not exist in 8 pixels adjacent to the (2,8) pixel. Since the label value '1' is already assigned to another object, a new label value '2' is assigned to the (2,8) pixel.

A label image obtained by labeling a 10×10 block image in the above-mentioned way is shown in Table 4.

TABLE 4

| 0 | 0 | 0 | 0 | 0 | 0 | 0 | 0 | 0 | 0 |
|---|---|---|---|---|---|---|---|---|---|
| 0 | 1 | 1 | 1 | 1 | 0 | 0 | 2 | 0 | 0 |
| 0 | 1 | 1 | 1 | 0 | 0 | 0 | 2 | 0 | 0 |
| 0 | 1 | 1 | 1 | 0 | 0 | 0 | 2 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 3 | 3 | 0 | 0 | 0 | 0 |
| 0 | 4 | 0 | 0 | 0 | 0 | 0 | 0 | 5 | 0 |
| 0 | 4 | 0 | 0 | 0 | 0 | 0 | 0 | 5 | 0 |
| 0 | 0 | 0 | 0 | 0 | 0 | 0 | 0 | 0 | 0 |

As shown in Table 4, the labeling operation is performed on all pixels of the target image. In the case where a pixel located at the edge is a target pixel, a limited transformation matrix area or a default value may be used depending on the image processing application.

After the labeling operation is completed and each object in the target image is distinguished, the label information computing unit 140 checks the properties of each area assigned with the same label value. The label information computing unit 140 receives a label image assigned with a label value from the labeling unit 120 (S350), and computes label information for the labeled image including at least one of start point, end point and area information for each labeled area (S360).

For example, there are five label areas shown in Table 4 (represented by label values 1, 2, 3, 4 and 5). The label information computing unit 140 computes image property information, i.e. label information, for the five label areas.

For the label area (Range Of Interest—"ROI") assigned with a label value '1', the start point is (2,2) and the end point is (4,5). The end point may be set based on the actual area assigned with the same label value or based on the maximum outline of the area assigned with the same label value. The end point is (4,5) based on the maximum outline.

The area information based on the actual area assigned with label values is '0', and the area information based on the maximum outline is '12'. The property information of each ROI is computed in the manner above, and the property information is used as reference data in various subsequent applications.

The label information computing unit 140 may include a merging unit 142. If the label areas corresponding to the chosen label information overlap with each other, the merging unit 142 is configured to merge the label areas and compute label information of the merged label area.

TABLE 5

| 0 | 0 | 0 | 0 | 0 | 0 | 0 | 0 | 0 | 0 |
|---|---|---|---|---|---|---|---|---|---|
| 0 | 1 | 1 | 1 | 1 | 1 | 0 | 0 | 0 | 0 |
| 0 | 1 | 1 | 1 | 0 | 0 | 0 | 0 | 0 | 0 |
| 0 | 1 | 1 | 1 | 0 | 2 | 2 | 2 | 0 | 0 |
| 0 | 1 | 1 | 1 | 0 | 2 | 2 | 2 | 0 | 0 |
| 0 | 0 | 0 | 0 | 0 | 2 | 2 | 0 | 0 | 0 |

In Table 5, two areas, ROI-1 and ROI-2 assigned with different label values '1' and '2', respectively, overlap each other. In this case, the label values assigned to the areas are not equal to each other, however, it may be preferable to combine the objects of the image into the same area.

In other words, preferably ROI-1, a label area assigned with '1' and ROI-2, a label area assigned with '2' are merged and label information of the merged label area is computed. If the merged label area is referred to as ROI-M, the start point of ROI-M is (2,2) and the end point is (6,8). If area information of ROI-M is computed based on the actual area assigned with label values, then the area information is '22'.

The merged label area ROI-M may be assigned with a label value '1' or '2', or a new label value. The label values '1' and '2' were not used in another label area, and thus can be assigned to the merged label area ROI-M. The merged label area ROI-M may be assigned with a new label value (for example, a value of 10 or more) that is not used in another label area, so that the merged label area is expressed by a prearranged symbol representing a merged area.

Figure 7:
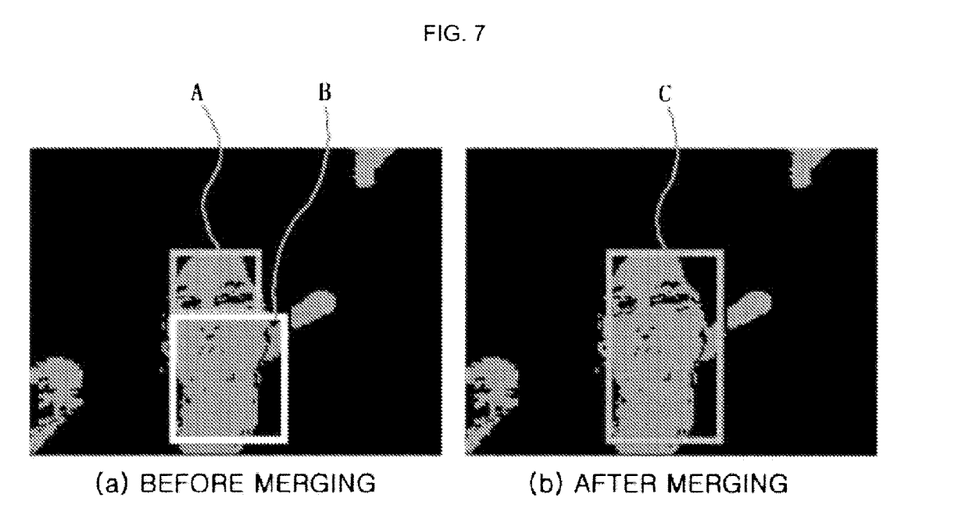
FIGS. 7(a) and 7(b) illustrate a result of a merging process according to an embodiment of the invention.

FIG. 7(a) shows image information before merging, and FIG. 7(b) shows the image information after merging. That is, two label areas (A, B) in FIG. 7(a) are merged into one label area (C) through the above-mentioned process.

Figure 2:
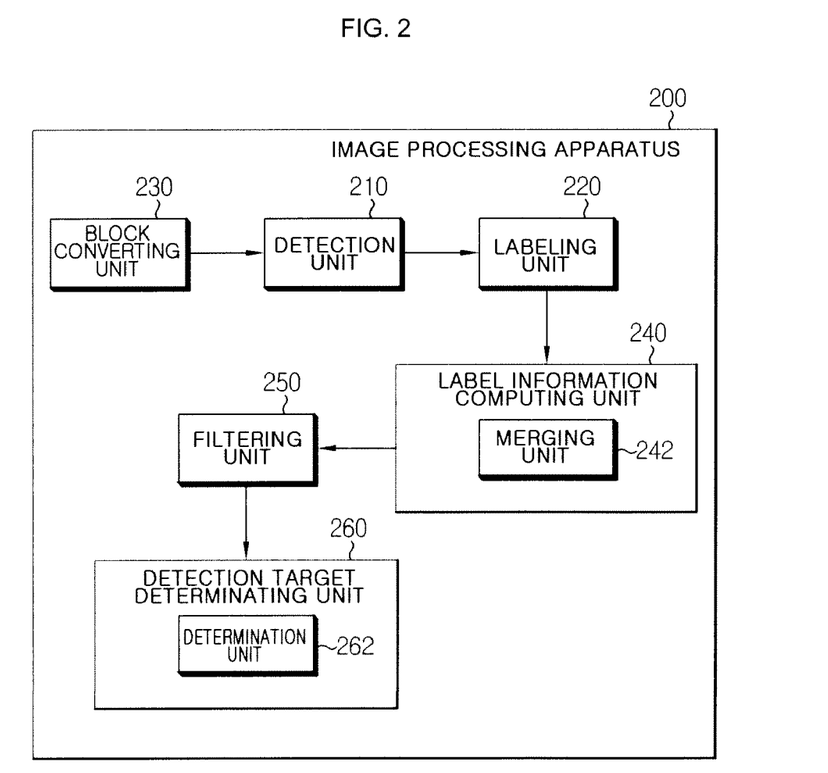
FIG. 2 illustrates an image processing apparatus according to another embodiment of the invention.
Figure 4:
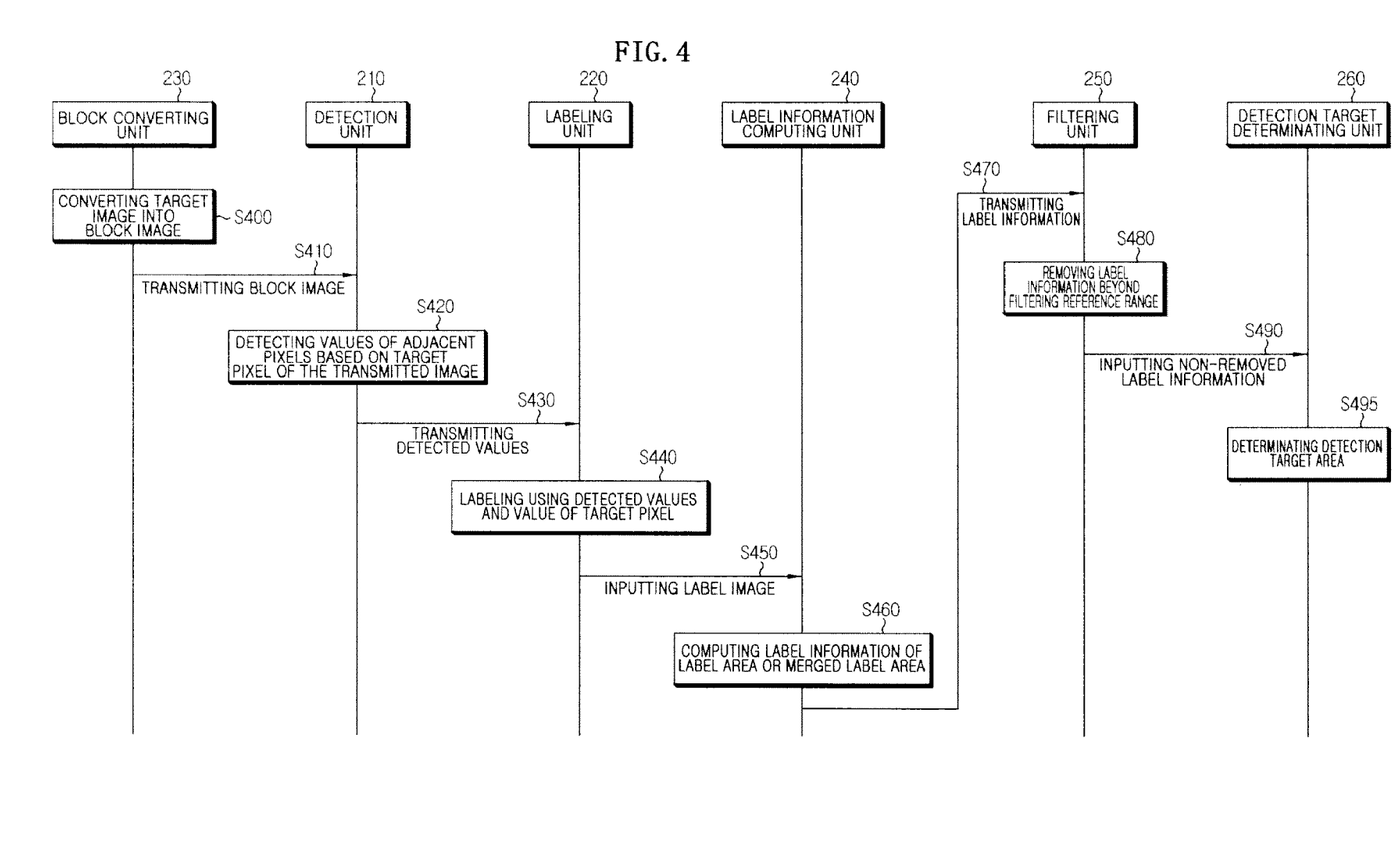
FIG. 4 illustrates an image processing method using the embodiment of FIG. 2.

An image processing apparatus and method according to another embodiment of the invention are now described with reference to FIGS. 2 and 4. The image processing apparatus and method of this embodiment use the above-mentioned labeling technique, and are configured to detect a specific object in an image, for example, facial recognition, recognition of a specific human body part, or defectively manufactured part. FIG. 2 is a block diagram illustrating an image processing apparatus 200, and FIG. 4 illustrates an image processing method using the apparatus of FIG. 2.

The image processing apparatus 200 comprises a block converting unit 230, a detection unit 210, a labeling unit 220, a label information computing unit 240, a filtering unit 250, and a detection target determining unit 260. The block converting unit 230, the detection unit 210, the labeling unit 220, and the label information computing unit 240 are the same as those shown in the embodiment of FIG. 1, and their description is accordingly omitted.

The detection target determining unit 260 receives information about the pixels assigned with label values from the labeling unit 220, and determines a detection target using a statistical computation value of the pixels assigned with the label value. The statistical computation value of the pixels assigned with the label value includes various information, for example, average, dispersion, distribution, standard deviation or the number of pixels assigned with the label value. A pixel assigned with a label value corresponding to a detection target is detected using the statistical computation value.

To improve the precision and efficiency of detection, the label information computing unit 240 computes at least one piece of label information for each label area selected from the group consisting of a start point, an end point and area information of a label area assigned with the same label value.

The detection target determining unit 260 includes a determination unit 262. The determination unit 262 is configured to (1) receive the label information from the label information computing unit 240, (2) classify the label information of each label area according to how consistent the label information is with reference information, and (3) determine a detection target area using the classified label information. That is, the determination unit 262 receives various information regarding each label area, and detects a detection target area according to how much the received information is consistent with reference information for detecting a desired detection target. A specific feature of the reference information is described below. The determination unit 262 may classify each label area according to how consistent the received information is with the reference information, and determine a highest rank label area as a detection target or select a predetermined order of label area as a detection target area.

As mentioned above, the block converting unit 230 converts the target image into a block image (S400). The detection unit 210 receives the block image converted by the block converting unit 230 as a binary image (S410) and detects values of pixels adjacent to a target pixel in the received binary image (S420).

The label information computing unit 240 of the image processing apparatus 200 may include a merging unit 242. If label areas defined by their label information overlap with each other, the merging unit 242 merges the label areas and computes new label information of the merged label area. That is, the labeling unit 220 receives the detected values of the adjacent pixels from the detection unit (S430), and performs labeling using the detected values of the adjacent pixels and the value of the target pixel (S440). After labeling is completed, the labeling unit 220 transmits the label image to the label information computing unit 240 (S450). The label information computing unit 240 and the merging unit 242 compute label information for the label area or the merged label area (S460).

The filtering unit 250 performs NR (Noise Reduction). The filtering unit 250 receives the label information from the label information computing unit 240 (S470) and removes a label area that deviates from a filtering reference range (S480).

Figure 8:
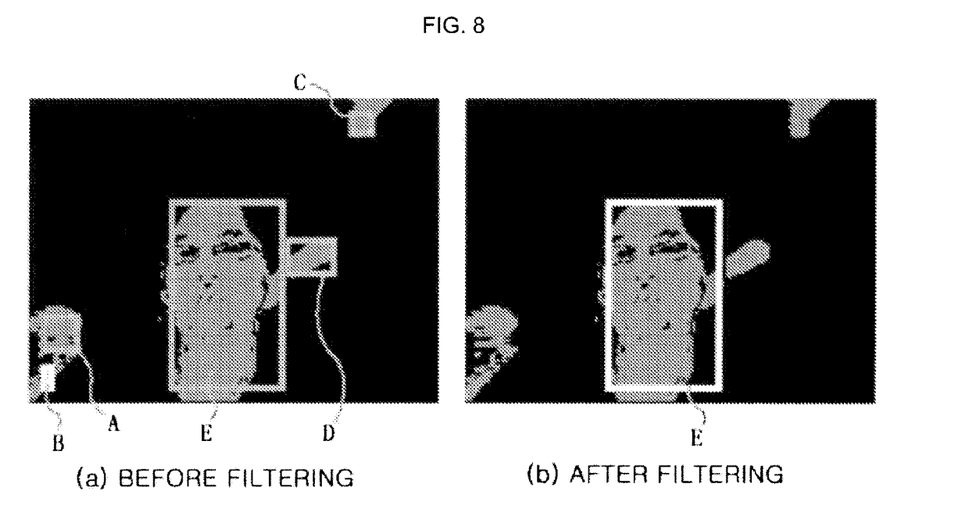
FIGS. 8(a) and 8(b) illustrate a result of a filtering process according to an embodiment of the invention.

As shown in FIG. 8, the filtering unit 250 filters off a label area that is less than a reference range, for example a number of pixels less than a reference range, from a desired target. FIG. 8 shows a result of the filtering process in which five label areas of FIG. 8(a) are filtered into one label area of FIG. 8(b) in such a way that a label area having the number of pixels less than a reference range is filtered off. That is, among the label areas A, B, C, D and E in FIG. 8(a), A, B, C and D are filtered off because they have less number of pixels (or size) than a reference range. Only label area E, having the number of pixels corresponding to a reference range, remains as shown in FIG. 8(b).

Detection of a facial area is described as an example. However, a pixel corresponding to a critical range may be part of the background as well as the actual facial area.

If a label area deviates from a reference range, the label information of the label area is removed to exclude an object that is similar to, but is not, an actual facial area.

The reference range for filtering may be set using the number of label areas or various information of a label area. Preferably, the reference range is computed objectively by various experiments or characteristics of an object included in an image so as to be consistent with characteristics of a detection target.

For example, in facial detection, an image is generally obtained by positioning an optical device close to a subject, and the reference range may be set using the location of a label area in the obtained image. Typically, an object representing the face is located at the center portion of an image. Thus the reference range may be set by determining whether or not a label area of a predetermined size is located in the range of a predetermined distance from the center of the image. The reference range may be set by considering only the size of a label area and may exclude a label area having a size less than a predetermined size.

After the filtering unit 250 filters off label information that deviates from the reference range as mentioned above, the filtering unit 250 transmits only the non-removed label information to the detection target determining unit 260 (S490). The detection target determining unit 260, in particular the determination unit 262, determines a detection target area using the remaining label information (S495).

The reference information used to detect the detection target area by the detection target determining unit 260 including the determination unit 262 may be set using at least one piece of information selected from the group consisting of a size of a label area to a size of the entire image, a location of a label area in the entire image, and an aspect ratio of a label area and the number of second values existing in a label area. Even after the filtering step, there may exist a large area having image information (e.g. color) that is similar to the detection target area. Therefore, the determination unit 262 selects an approximate detection target among the potential label areas (ROIs).

With regard to reference information, the information about a size of a label area to a size of the entire image is based on the fact that a target image occupying the entire image is more likely than the target image occupying too little or too much of the entire image. That is, it is likely that a small area is an object existing outside of another object. It is also likely that an excessively large area is the background of the image.

When an image of a face is created using an optical device, the possibility that a face image is located at the center of the entire image is higher than the possibility that it is located at the edge of the entire image. Thus, the location information may be chosen as a criterion for determining a detection target using a predetermined distance from a reference point.

The aspect ratio information of the label area is information where physical properties of an object to be detected are represented. The aspect ratio corresponds to a reference information set using the actual shape properties of an object to be detected. For example, if a face is the detection target, then an aspect ratio of 0.7 or 0.8 is expected to represent an area suitable for a human rather than an unusually small or large aspect ratios such as 0.1 or 8.

Further, the reference information may be set using information about the number of second values existing in a label area or the ratio of the number of second values to a size of a label area. For example, a face is more of an oval shape rather than a square shape. Thus, a ratio of an oval shape to a square shape of a label area (ROI), i.e., information about the number of second values can increase precision of facial detection. The reference information may be set using various information according to physical properties of a detection target and image properties having the same, and at least one piece of reference information may be used by selective combination. Each label area is assigned a score (point) by the reference information. The label area having a highest score or a predetermined order is determined as a detection target area.

It should be understood that each component of the image processing apparatus according to the invention is not necessarily divided physically, but logically. That is, each component corresponds to a logic function for realizing the invention. Thus, it should be understood that a logical function may be performed by one or more physical components operating integrally or separately.

The image processing method according to the invention may be incorporated as a computer readable code on a computer readable medium. The computer readable medium includes all kinds of storage devices for storing data readable by a computer system. For example, the computer readable medium may be a ROM, RAM, CD-ROM, magnetic tape, floppy disc or optical data storage device. The computer readable medium may store an executable code that is dispersed in computer systems connected to each other via a network and is readable by a computer through a network. Further, program code and code segments for implementing the image processing method may be easily inferred by programmers with ordinary skill in the art.

Only a few implementations and examples are described herein. Other implementations, enhancements and variations that may be made by persons of ordinary skill in the art based on what is described and illustrated herein may still be within the scope of the invention.

The labeling technique of the invention may support the auto focus function, auto white balance function or auto exposure function used in a digital optical device such as a digital camera. The labeling technique of the invention has various uses, and the object detection technique using the labeling technique can be used to produce an effective optical device with limited resources. Moreover, the image processing apparatus according to the invention improves the efficiency of each function and can be incorporated into simple hardware.

Therefore, this invention provides a highly economical, efficient, and useful image processing apparatus for a mobile terminal.

What is claimed is:

1. An image processing apparatus comprising:
   a detection unit operative to detect binary and label values of pixels adjacent to a target pixel in a binary image where the target pixel and the adjacent pixels are defined by a transformation matrix; and
   a labeling unit operative to assign a label value to the target pixel wherein:
   if none of the adjacent pixels have been assigned a label value, then the target pixel is assigned a new label value, and
   if any of the adjacent pixels has been assigned a label value, then the target pixel is assigned the same label value.

2. The image processing apparatus according to claim 1, wherein the pixels of the binary image have either a first binary value that is smaller than a critical value or a second binary value that is larger than the critical value.

3. The image processing apparatus according to claim 2 wherein the labeling unit assigns: a new label value to the target pixel if the target pixel has the second binary value and all of the adjacent pixels have either the first or second binary value, or a label value in the adjacent pixels to the target pixel if the target pixel has the second binary value and one of the adjacent pixels has a label value other than the first or second binary value.

4. The image processing apparatus according to claim 2, further comprising a block converting unit operative to convert the target image into a block image having a uniform binary value assigned to all pixels of a block by:
   dividing a target image into a predetermined number of blocks according to a block ratio; and
   assigning the second binary value to pixels in a block if the number of pixels in the block having values within a critical range is greater than a reference number, or
   assigning the first binary value to pixels in a block if the number of pixels in the block having values within the critical range is less than the reference number;
   wherein the detection unit receives the block image from the block converting unit as the binary image.

5. The image processing apparatus according to claim 1, further comprising a detection target determining unit operative to determine a detection target using a statistical computation value of the pixels that have been assigned a label value.

6. The image processing apparatus according to claim 5, further comprising a label information computing unit operative to compute label information of a label area, where the label information comprises information from a group consisting of a start point, an end point, and an area of a label area assigned with the same label value.

7. The image processing apparatus according to claim 6, wherein the detection target determining unit includes a determination unit operative to:
   classify the label information of each label area based on how consistent the label information is with reference information; and
   determine a detection target area using the classified label information.

8. The image processing apparatus according to claim 7, wherein the label information computing unit further includes a merging unit operative to:
   merge label areas based on label information if the label areas overlap with each other; and
   compute label information of the merged label area.

9. The image processing apparatus according to claim 7, further comprising a filtering unit operative to remove a label area beyond a filtering reference range, wherein the determination unit uses label information of only the remaining label area after filtering.

10. The image processing apparatus according to claim 7, wherein the reference information for determining the detection target is set using at least one piece of information selected from the group consisting of a size of a label area, a size of the entire image, a location of a label area in the entire image, and a ratio of a label area to a number of second values in the label area.

11. An image processing method comprising:
    using a processor to perform the steps of:
    detecting binary and label values of pixels adjacent to a target pixel in a binary image where the target pixel and the adjacent pixels are defined by a transformation matrix; and assigning a label value to the target pixel wherein:
    if none of the adjacent pixels have been assigned a label value then the target pixel is assigned a new label value, or if any of the adjacent pixels has been assigned a label value then the target pixel is assigned the same label value.

12. The image processing method according to claim 11, wherein the pixels of the binary image have either a first binary value that is smaller than a critical value or a second binary value that is larger than the critical value.

13. The image processing method according to claim 12, wherein, the assigning of a label value further comprises:
    assigning a new label if the target pixel has the second binary value and all of the adjacent pixels have either the first or second binary value, or
    assigning a label value existing in the adjacent pixels if the target pixel has the second binary value and one of the adjacent pixels has a label value other than the first or second binary value.

14. The image processing method according to claim 12, further comprising converting the target image into a block image having a uniform binary value assigned to all pixels of a block by:
    dividing a target image into a predetermined number of blocks according to a block ratio; and
    assigning the second binary value to pixels in a block if the number of pixels in the block having values within a critical range is greater than a reference number, or assigning the first binary value to pixels in a block if the number of pixels in the block having values within the critical range is less than the reference number;
    wherein the detecting values further comprises receiving the block image as the binary image.

15. The image processing method according to claim 11, further comprising determining a detection target using a statistical computation value of the pixels that have been assigned a label value.

16. The image processing method according to claim 15, further comprising computing label information of a label area, where the label information comprises at least one piece of information from a group consisting of a start point, an end point, and an area of a label area assigned with the same label value.

17. The image processing method according to claim 16, wherein the determining of a detection target includes:
    classifying the label information of each label area based on how consistent the label information is with reference information; and determining a detection target area using the classified label information.

18. The image processing method according to claim 17, wherein the computing of label information further includes:

merging label areas based on a label information if the label areas overlap with each other; and computing label information of the merged label area.

19. The image processing method according to claim 17, further comprising removing a label area beyond a filtering reference range, wherein the determining of a detection target uses label information of only the remaining label area after filtering.

20. The image processing method according to claim 17, wherein the reference information for determining the detection target is set using at least one piece of information selected from the group consisting of a size of a label area, a size of the entire image, a location of a label area in the entire image, and a ratio of a label area to a number of second values in the label area.

21. A non-transitory computer readable medium with computer executable instructions stored thereon for performing an image processing method, the method including:

detecting binary and label values of pixels adjacent to a target pixel in a binary image where the target pixel and the adjacent pixels are defined by a transformation matrix; and assigning a label value to the target pixel wherein:

if none of the adjacent pixels have been assigned a label value then the target pixel is assigned a new label value, or if any of the adjacent pixels has been assigned a label value then the target pixel is assigned the same label value.

* * * * *